INVENTORS.
GILBERT FORRESTER
CLYDE P. GRANT
ROBERT L. SMITH

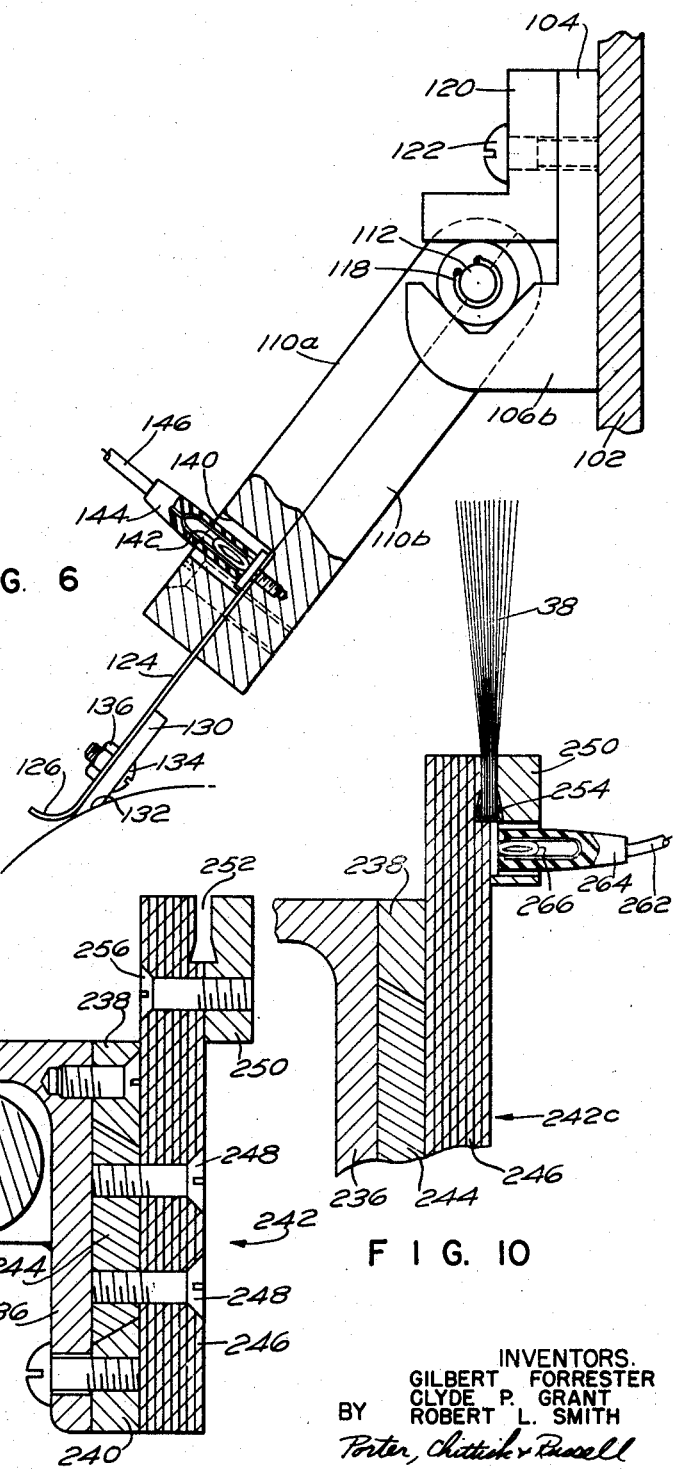

Oct. 6, 1964    G. FORRESTER ETAL    3,151,482
APPARATUS FOR INSPECTING, CUTTING, AND SORTING PAPER
Filed Nov. 25, 1958    12 Sheets-Sheet 6
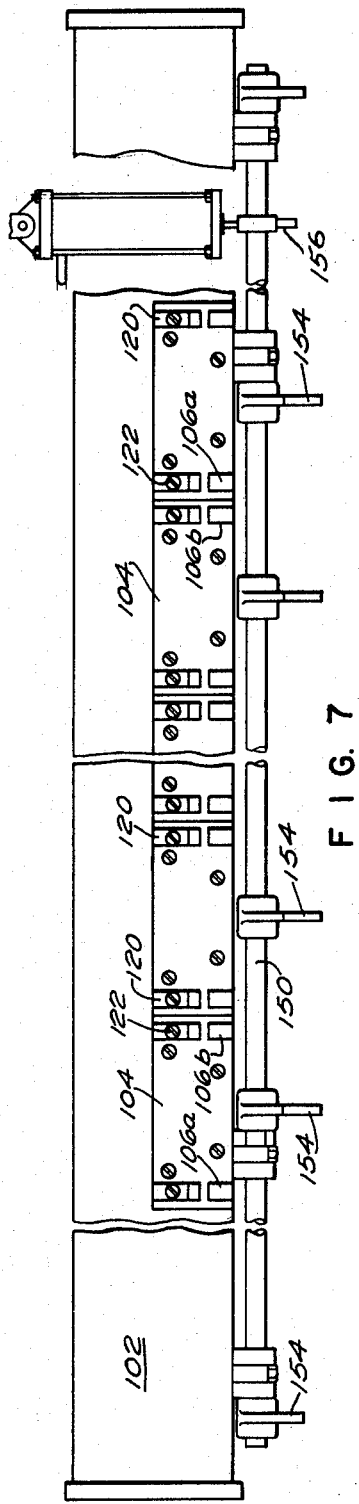
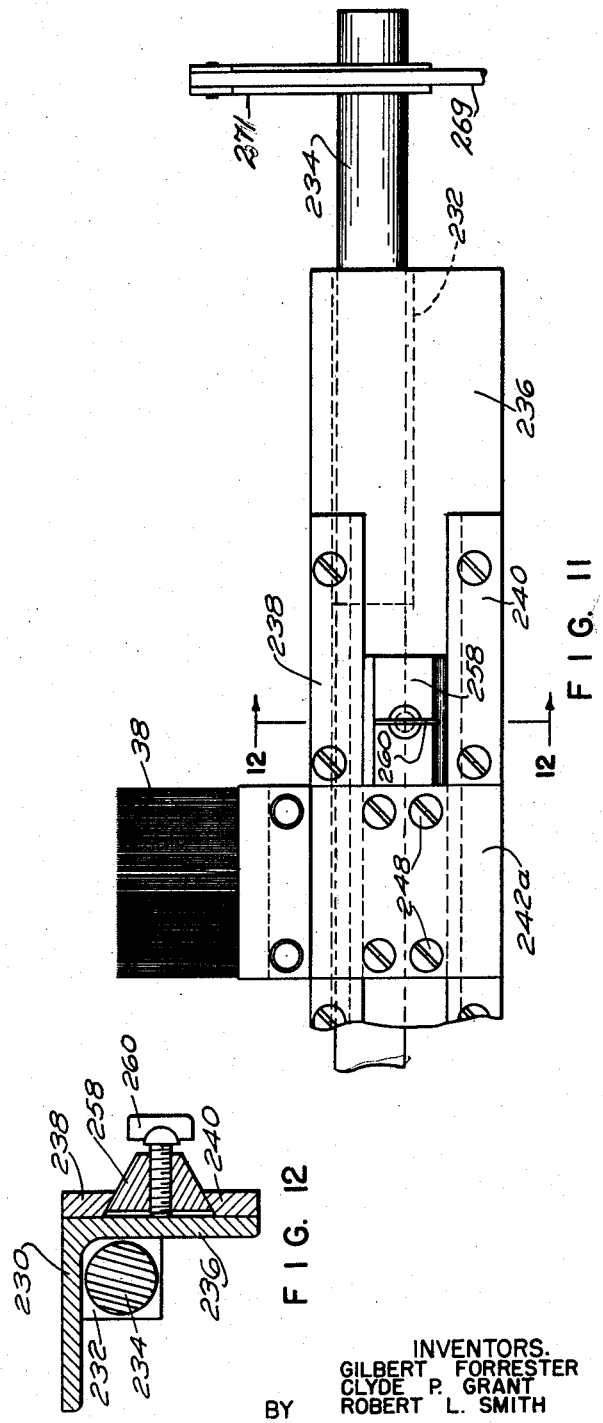
INVENTORS.
GILBERT FORRESTER
CLYDE P. GRANT
BY ROBERT L. SMITH
Porter, Chittick & Russell
ATTORNEYS

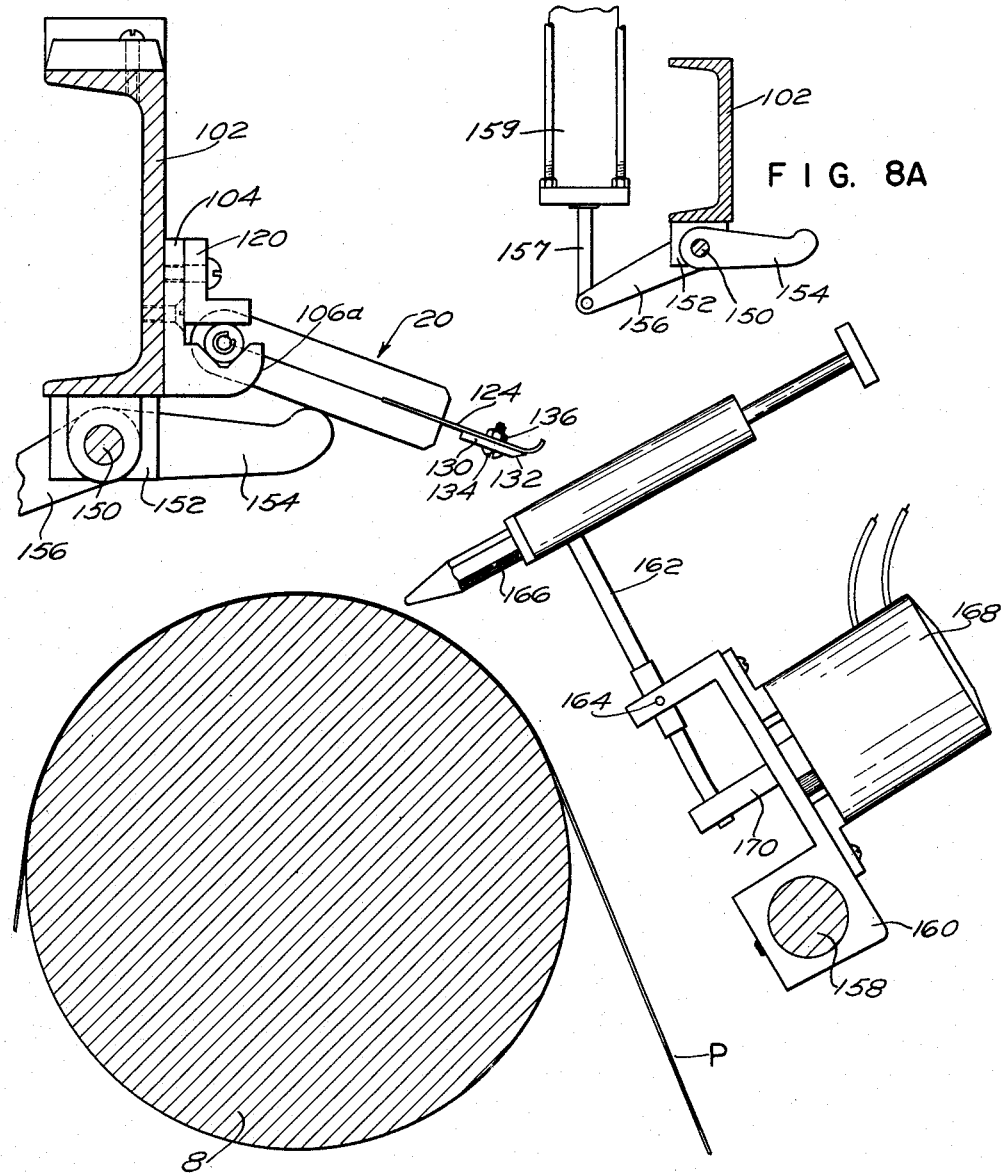

INVENTORS.
GILBERT FORRESTER
CLYDE P. GRANT
ROBERT L. SMITH
BY Porter, Chittick & Russell
ATTORNEYS

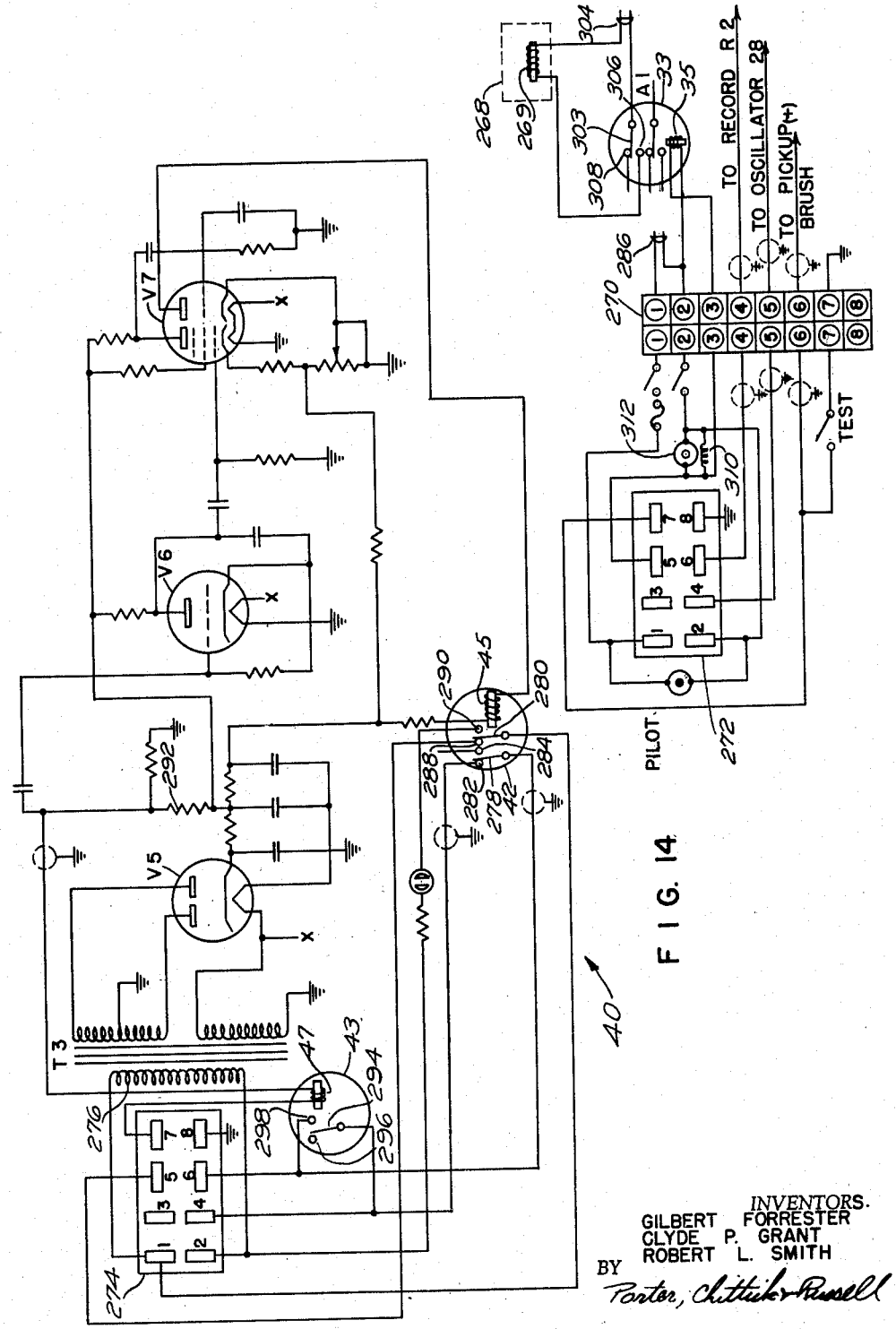

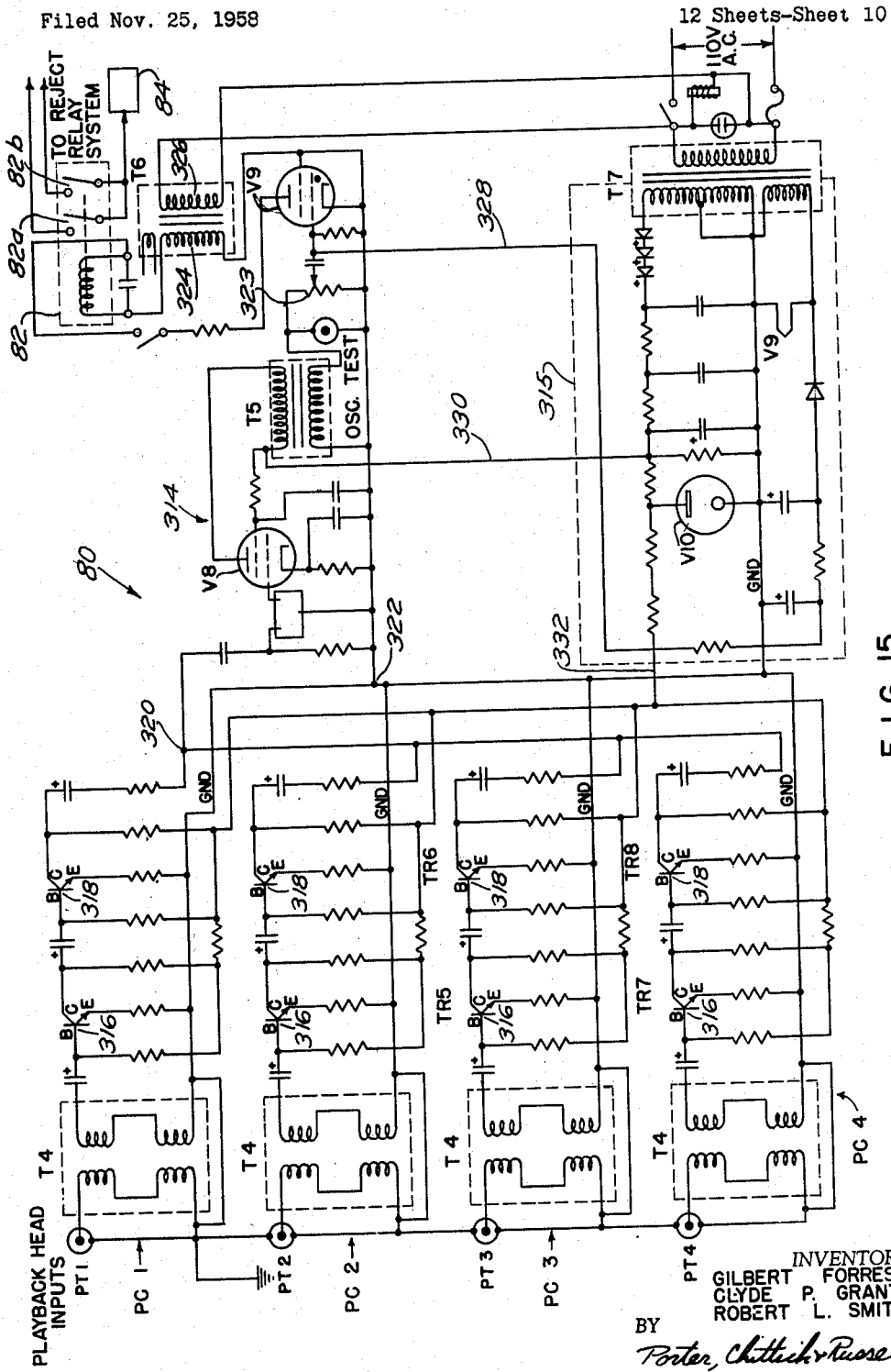

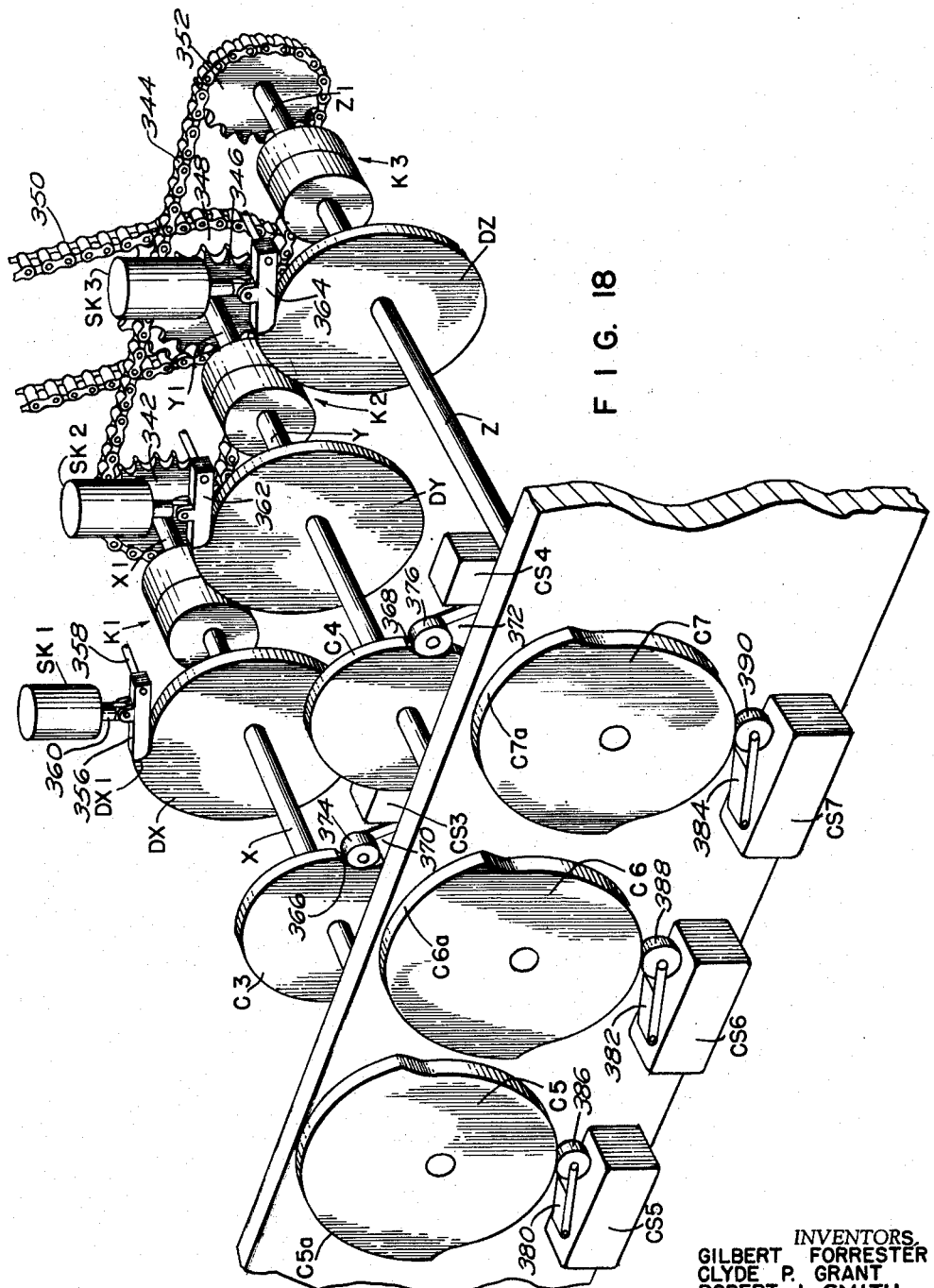

United States Patent Office

3,151,482
Patented Oct. 6, 1964

3,151,482
APPARATUS FOR INSPECTING, CUTTING, AND SORTING PAPER
Gilbert Forrester, Falmouth, and Clyde P. Grant and Robert L. Smith, Gorham, Maine, assignors to S. D. Warren Company, Boston, Mass., a corporation of Massachusetts
Filed Nov. 25, 1958, Ser. No. 776,342
7 Claims. (Cl. 73—159)

This invention relates to a machine for automatically inspecting, cutting, and sorting paper, and more particularly to a machine for inspecting a web of paper traveling at high speeds to detect the existence and location of defects therein, for cutting the web into sheets of predetermined length, and for sorting the sheets to automatically divert defective sheets to one pile and deliver good sheets to another pile.

Through the years, so-called automatic systems of paper inspecting have been devised to detect the presence of defects such as bumps, holes, etc., in a paper web. Most of these have been based on visual detection of paper faults. Because of the limitations of the human eye, the systems have been slow and hardly justified the name automatic. In other words, these machine systems were at best only semi-automatic. Other systems have been devised which have employed mechanical or electrical detection of paper faults. However, these systems have also been unsatisfactory. For one thing, the systems have been limited by the efficiency of the detecting mechanisms. Thus, for example, prior means for detecting irregularities in caliper of the paper have been unable to distinguish between abrupt and gradual changes in the caliper of the paper. This is important, for in many situations gradual changes in caliper are unobjectionable whereas rapid changes in caliper as, for example, a bump, are objectionable and should be eliminated. Similarly, prior defect detecting elements have been unable to distinguish between abrupt changes in caliper and the presence of holes or conductive particles in the paper. Other reasons for considering prior art devices unsatisfactory include the inability of the machine to distinguish between two defects occurring in the same cut sheet of paper and two defects occurring in separate cut sheets of paper. A further limitation of previous devices has been the necessity of limiting the speed at which the web moves in order to make it possible to reject two successive sheets without interrupting operation of the machine.

Accordingly, the object of the present invention is to provide a machine for inspecting, cutting, and sorting paper that is fully automatic and is free of the limitations of machines heretofore constructed or contemplated for the same purpose. Another object is to provide a novel method of inspecting, cutting and sorting paper.

The present invention relates to a system for inspecting paper in continuous web form to determine the existence and location of (1) holes, (2) abrupt caliper changes, and (3) particles of foreign conductive material. Detection of the foregoing defects is performed by means of novel detecting mechanism. Automatic sorting of the defective paper from the good paper is performed automatically and the high speed of operation is made possible by a memory device which is mechanically linked with the sheet cutting mechanism of the machine and which determines at the instant the sheet is cut from the web whether the sheet is good or bad and automatically operates switching mechanisms which divert each cut sheet to one or the other of two piles. One pile is made up of sheets which are free of defects, and the other pile is made up of sheets which contain defects detected by the sensing mechanism.

The machine of the present invention has the following elements in the order of process:

(1) A stand for holding a roll of paper so that it may be unwound; (2) means for transporting and tensioning the web of paper so as to provide a uniform flow of smooth paper through the machine; (3) one or more paper web inspection devices through which all of the paper must pass on its way to the cutting section; (4) a memory device for receiving and storing electrical impulses; (5) means for extracting the electrical impulses stored in said memory device; (6) a web cutting or sheeting device conventionally known in the industry as a sheeter cutter; (7) a sheet handling device consisting of means for carrying the sheets forward along a predetermined first path; (8) gate means for directing defective sheets during their forward motion into a second predetermined path; (9) means triggered by the electrical signals extracted from said memory device for operating said gate means whereby to divert defective sheets into said second path; and (10) means operated by the electrical impulses extracted from said memory device for discriminating between successive defective sheets whereby said sheet directing means will operate to divert each of said successive defective sheets into said second path.

Other objects and features and many of the attendant advantages of the present invention will become more apparent as reference is had to the following detailed description when considered together with the accompanying drawings wherein:

FIG. 6 is a side elevation partly in section of the bump detector mechanism showing how a skid is connected to its electrical power supply;

FIG. 7 is a front view of the mechanism which pivotally supports the several skids of the bump detector mechanism;

FIG. 8 is a view similar to FIG. 5 showing how the skids are lifted mechanically to facilitate threading the web through the machine preparatory to starting up;

FIG. 8a is a vertical section on a reduced scale showing the means for lifting the skids;

FIG. 9 is a vertical cross section of the void detector mechanism which supports the conductive bristles that search out voids in the web;

FIG. 10 is a fragmentary sectional view similar to FIG. 9 showing how the conductive bristles are held in place and connected to the void detector power supply;

FIG. 11 is a front view of one end of the void detector mechanism;

FIG. 12 is a sectional view taken along line 12—12 of FIG. 11;

FIG. 14 is a circuit diagram of the void detector amplifier and power supply, the amplifier output relay, and the auxiliary relay for operating the void detector web marker;

FIG. 15 is a circuit diagram of the playback system for the memory drum including the playback system output relay;

FIG. 18 is an enlarged perspective view of most of the mechanical elements illustrated in FIG. 17.

The machine of the present invention includes mechanical and electrical elements such as a sheeter-cutter, electric motors, chain and gear drives, switches, relays, and an oscillator that are both old and well known in the mechanical and electrical arts. Therefore, except where it has been deemed necessary for the purposes of fully disclosing the invention, the old and conventional and commercially available elements and sub-assemblies are illustrated and described in the present application in a general or schematic manner so as to more clearly highlight the novel features of the invention. In addition, wherever feasible, component sections or sub-assemblies of the machine are described separately in order to facilitate full appreciation of their constructions and functions.

Figure 1:
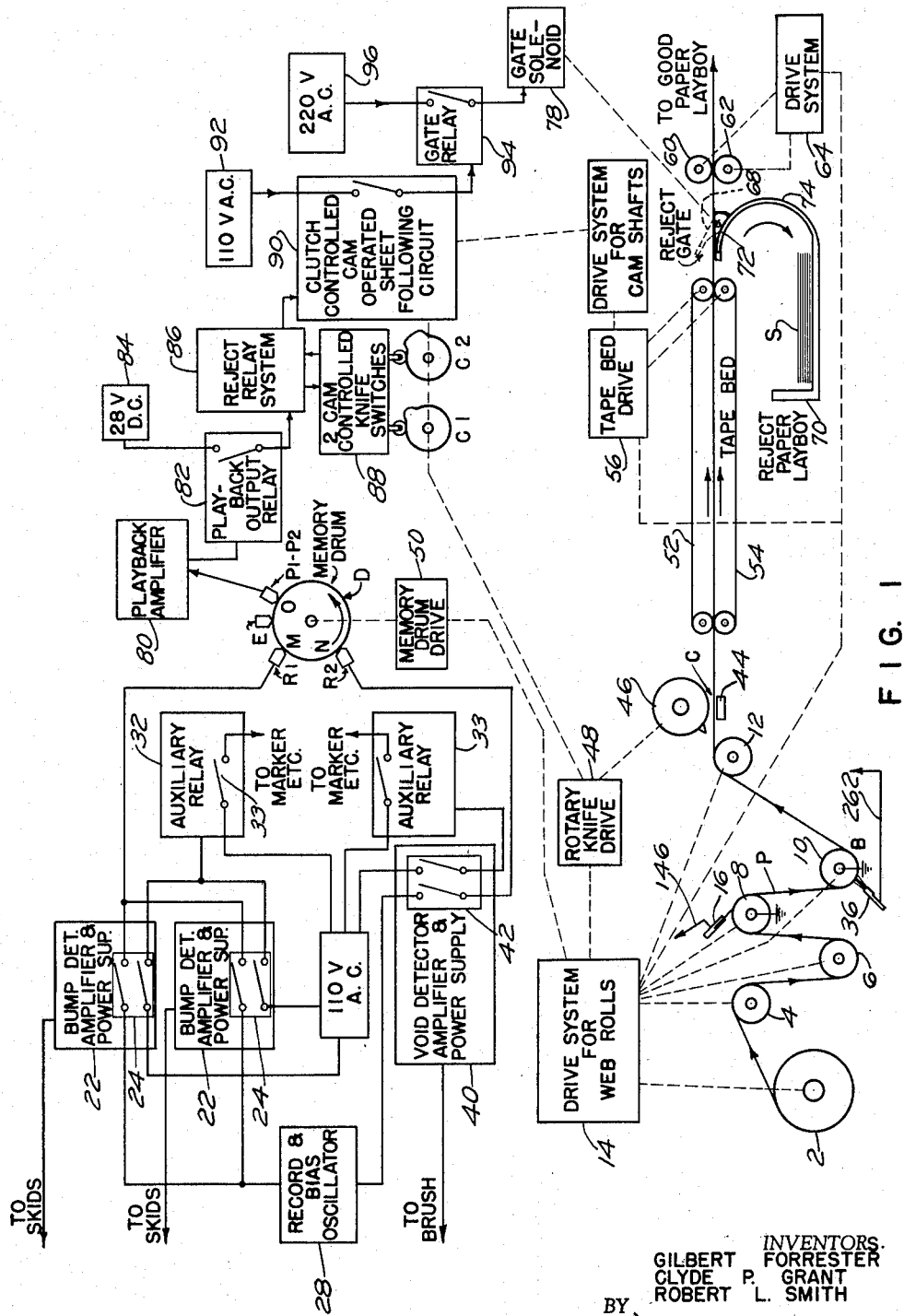
FIG. 1 is schematic representation of the mechanical and electrical elements of the machine embodying the present invention.

Before proceeding to a detailed description of the various novel and mechanical features of the present invention, there is presented immediately hereafter a general description of the mode of operation of the machine as it is illustrated schematically in FIG. 1.

Figure 2:
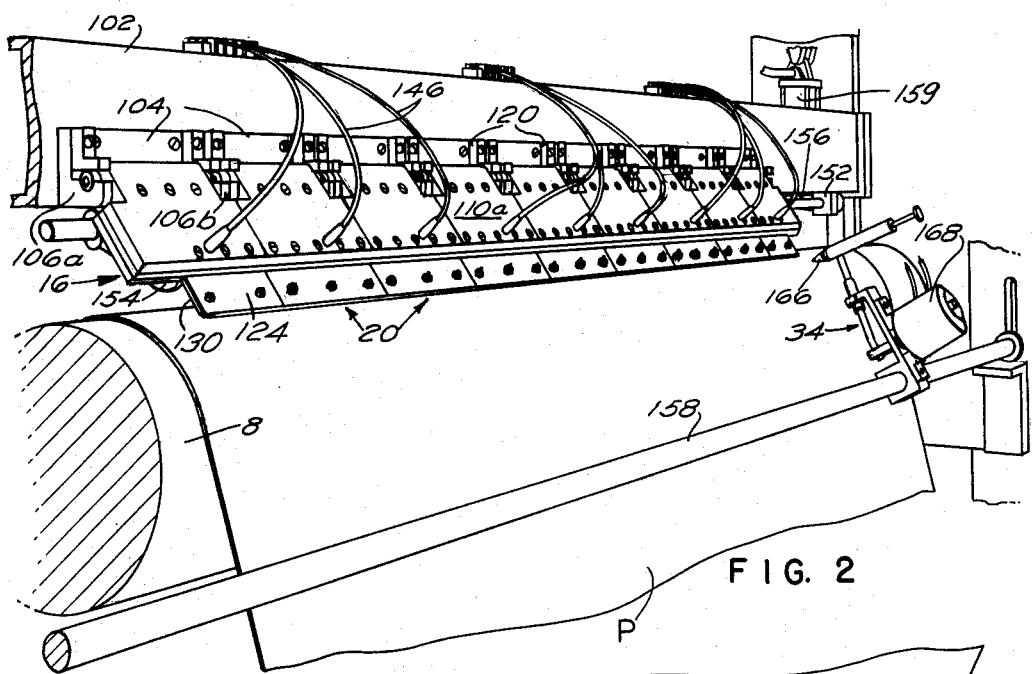
FIG. 2 is an enlarged perspective view of the bump detector mechanism of the machine.

The web of paper P to be processed is fed from a supply roll 2 by means of drive rolls 4, 6, 8, 10, and 12 which are driven by a common drive system 14. Rolls 8 and 10 are grounded electrically. Associated with roll 8 is a bump detector 16 which senses abrupt changes in the caliper of the web. The bump detector 16 comprises a plurality of skids 20 (FIG. 2) whose arrangement and construction are described in detail hereinafter. The skids are electrically connected to one or more bump detector amplifier and power supply units 22, each provided with an output relay shown schematically at 24. When a bump or abrupt change in caliper occurs, it deflects one or more of the skids. Deflection of a skid causes the output relay 24 of one of the amplifier units 22 to close momentarily to pass the output signal from an oscillator 28 to a recording head R1 which impresses the signal on a rotating memory drum D. Oscillator 28 is a commercially available unit and provides a continuous 1,000 cycle record signal and a 100,000 cycle bias signal for recording on the memory drum. Since (1) any conventional oscillator capable of giving an output signal with the desired frequencies may be employed in the system and (2) it is old in the magnetic recording art to use an A.C. record pulse superposed on an A.C. bias signal, it is not believed necessary to describe and illustrate the oscillator in detail. The amplifier output relays 24 also function to operate an auxiliary relay 32 which functions to operate a web-marking device 34 (FIG. 2).

Associated with electrically grounded roll 10 is a void detector 36 which consists of a large number of metallic bristles 38 (FIG. 3) which engage the bottom surface of the web P and search out voids in the web. Details of the void detector are described hereinafter. The void detector is connected to an amplifier and power supply unit 40 having an output relay shown schematically at 42 which functions momentarily when a void is detected to pass the oscillator signal in the form of a pulse to a second recording head R2 which impresses the pulse on the magnetic recording drum D. Since the bump detector scans the web first at roll 8 and the void detector scans the web at roll 10, which is later in point of time to web travel, record head R2 is displaced from record head R1 in the direction of rotation of the memory drum by an angular amount equivalent in terms of time to the time required for the web to proceed from bump detector 16 to void detector 36. Memory drum D is a conventional unit comprising a magnetizable recording surface. The recording heads R1 and R2 also are conventional units, and they are spaced longitudinally of the memory drum so that they record along different "tracks." Also associated with the recording drum are two playback heads P1 and P2. Only one playback head is illustrated since they are located in side-by-side relationship so that they may read out the signals impressed on the drum by recording heads R1 and R2 respectively. Playback heads P1 and P2 are displaced from recording head R2 by an angular amount equivalent in terms of time to the time required for the web to travel from the void detector 36 to a bed knife shown schematically at 44. Located between the playback heads P1 and P2 and record head R1 is a permanent magnet E which erases the signals impressed on the memory drum after they have been read out by the playback head.

The web is cut into sheets S at a predetermined point in its path of travel by a conventional sheeter-cutter comprising the stationary bed knife 44 and a rotary knife 46. The latter is driven by a rotary knife drive 48 which is mechanically linked to and driven by the drive system 14. Also linked to and operating in synchronism with drive system 14 is a drive system 50 which drives memory drum D.

The cut sheets are picked up and transported away from the knife section by a conventional tape bed comprising a series of cooperating upper and lower endless belts 52 and 54. These belts are driven by a conventional drive system 56 at a linear speed in excess of the speed at which the web P is transported so that as soon as a sheet is cut, it is moved away rapidly from the head of the next sheet to be cut. Consequently, successive sheets carried between the upper and lower belts of the tape bed are spaced from one another by a predetermined amount. The tape bed feeds sheets free of defects between a pair of rolls 60 and 62 driven by a conventional drive system 64 which is synchronized with drive system 14 for the web rolls and tape bed drive 56 as indicated by the broken lines connecting the same in FIG. 1. Rolls 60 and 62 act to send the defect-free sheets to a conventional good paper layboy (not shown).

Located between the tape bed and the slow-down rolls is a pivotal reject gate 68. Such reject gates are old in the paper machinery art, as shown for example in the United States Patent 2,399,582, issued on April 30, 1946, to Charles Stevens. The reject gate is associated with a reject paper layboy 70 which is mounted below the delivery end of the tape bed. The reject gate 68 actually comprises a series of identical steel members affixed to and spaced axially along a rotatable shaft 72. The reject paper layboy comprises a series of curved metal bars 74 spaced from each other transversely of the machine in alternately occurring relation with the steel members which make up the reject gate 68. Normally, the reject gate is disposed horizontally and acts as a supporting floor for the sheets of paper moving from the tape bed to the slow-down rolls. However, when the reject gate is pivoted upwardly by rotation of shaft 72, it acts to deflect the sheets of paper down into the reject layboy 70, with the bars 74 acting as guides for the sheets. The shaft 72 is linked mechanically to a solenoid 78 in a conventional manner as shown by the broken line extending between said elements. The reject gate is pivoted upwardly to reject position (shown in broken lines) when solenoid 78 is energized and restored to its normal horizontal position when the solenoid is de-energized.

The gate solenoid 78 is operated in response to the signals read out by playback heads P1 and P2. The latter apply the playback signals to a playback amplifier 80 which amplifies each playback signal and applies the amplified signal to an output relay 82 which closes to connect a 28 volt D.C. source 84 to a reject-relay system 86 which includes two switches represented schematically at 88 which are actuated by cams C1 and C2 which are mechanically linked to and operated in synchronism with rotary knife drive 48. The cam-operated switches 88 are represented separately from the reject-relay system 86 in FIG. 1 for the reason that they are not located on the same chassis as the reject-relay chassis.

The output of the reject-relay system is applied to a sheet following system 90 which includes means for tracking successive defective sheets of paper on the tape bed and for connecting a 110 volt A.C. source 92 to a gate relay 94 at the proper time to effect operation of the reject gate. Gate relay 94 functions when actuated to electrically connect gate solenoid 78 to a 220 volt A.C. energizing source 96.

*Bump Detector Mechanism 16*

This mechanism is illustrated schematically in FIG. 1 and in detail in FIGS. 2, 4, 5, 6, 7, and 8.

It comprises a supporting beam 102 of U-shaped cross-section which extends transversely of the machine above and slightly rearward of roll 8. Attached to the vertical face of this beam is a series of flat plates 104 each provided adjacent its opposite ends with forwardly extending horizontal arms 106a and 106b which have notches 108 in their top sides. Each pair of arms 106a and 106b supports a skid 20. These skids comprise a pair of flat rigid pieces 110a and 110b constructed of suitable insulating material such as a phenol-formaldehyde resin cured to a solid state under heat and pressure and preferably including suitable fillers such as cloth, paper, or wood. Frictionally sandwiched between these two pieces at their top ends is a shaft 112 provided at its opposite ends with rotatable sleeves 114 which are lined with suitable bearings 116. Snap rings 118 hold sleeves 114 on the shaft. Sleeves 114 rest in notches 108 of arms 106a and 106b and are retained therein by L-shaped brackets 120. Brackets 120 are secured to plates 104 by screws 122 and are rotatable on the latter to permit removal of shafts 112. Also sandwiched between each pair of pieces 110a and 110b but at their bottom ends is a conductive metal plate 124. Plate 124 extends below pieces 110 and its bottom edge is curved as shown at 126. The two pieces are held together by screws 128 which also pass through plate 124. Attached to metal plate 124 is a riding shoe 130 constructed of the same insulating material as pieces 110. The bottom edge 132 of shoe 130 is bevelled and engages roll 8 slightly forward of its axis of rotation. Shoe 130 has elongated holes 133. Screws 134 extend through holes 133 and also through suitable holes in metal plate 124. Nuts 136 cooperate with screws 134 to secure shoe 130 to metal plate 124. Holes 133 permit the shoe to be shifted relative to metal plate 124 to vary the clearance between plate 124 and the roll 8 and also to compensate for wear. Preferably, a clearance of between .001 and .004 inch is maintained between plate 124 and the roll 8. Preferably, the skids 20 are designed to engage the roll 8 at an angle at which they will not oscillate when deflected by bumps in the web.

Each piece 110a is provided with a hole 140 in which is permanently located a banana-type electrical plug 142 which is electrically connected to plate 124. Plug 142 is adapted to receive a cooperating connector jack 144 attached to the end of a cable 146. The cables 146 are connected to the amplifier and power-supply units 22. As explained hereinafter, the power-supply units produce a D.C. voltage which is applied to the plates 124 of the skids through cables 146, jacks 144, and plugs 142. With the electric potential applied to plates 124, a capacitive effect is established between these plates and roll 8 due to the air gap therebetween. The air gap or clearance between the skids and roll 8 is necessary in order for the bump detector to render uniform results since moisture or conductive particles in the web will have a bothersome, non-uniform effect on the leakage of the electrical charge between the skids and the roll if the plates 124 are in physical contact with the metal roll 8. The air gap renders the bump detector substantially non-responsive to moisture or metal particles in the web.

It is to be noted that the skids 20 (and the bristles of the void detector also) do not extend out to the side edges of the web but terminate a short distance—e.g., 1 inch from the edges. This is to avoid rejects due to the edge portions of the web being mangled or torn or the roll being exposed. The mangled edges are not objectionable since ultimately the side edges of the cut sheets are trimmed anyway by a guillotine cutter. Trimming may also be accomplished by edge cutters located on the upstream side of rotary knife 46.

For optimum operation the skids should have a width of between approximately 4 and 8 inches and preferably 6 inches. To reduce the number of bump-detector amplifiers, it is preferred to connect more than one skid to each amplifier. However, the number of skids that may be connected in parallel to one amplifier channel is limited since then the net change in amplifier input is the sum total of the changes produced by each skid. Where the skids have a width of 4 to 8 inches, the optimum number of skids that may be used with the amplifier and power-supply systems described hereinafter is three.

The bump detector mechanism also includes means for raising all of the skids 20 to facilitate initial threading of the paper web. The means for raising the skids comprises a shaft 150 rotatably secured to the bottom flange of beam 102 by means of bearing blocks 152. Affixed to and extending forwardly of shaft 150 are several arms 154, one for each skid 20. A rearwardly extending operating lever 156 is also attached to shaft 150. Normally, arms 154 are in the down position (FIG. 5) out of contact with the skids; but when lever 156 is pivoted down, arms 154 engage and elevate the skids away from roll 8, as shown in FIG. 8. Lever 156 may be manually operated, but preferably it is connected to and operated by an actuating mechanism such as a hydraulic or pneumatic actuator which is also capable of locking arms 154 in elevated position. Thus, for example, in FIGS. 2 and 8a lever 156 is pivotally connected to and actuated by the operating rod 157 of a conventional piston-type pneumatic actuator 159 which is secured to supporting beam 102.

A marker device also forms part of the bump detector section. The marker device is mounted on a transverse bar 158 located in front of roll 8 and attached to the side frames of the machine. It comprises a bracket 160 secured to bar 158, a lever 162 secured to the bracket by a pivot pin 164, a colored pencil 166 adjustably attached to one end of lever 162, and a solenoid 168 attached to the bracket and having its armature 170 connected to the other end of lever 162. The solenoid 168 is connected to auxiliary relay 32 (FIG. 1) which is actuated each time amplifier output relay 24 closes to apply a signal to record head R1. Solenoid 168 is energized each time relay 32 closes. When it is energized, its armature 170 is retracted and thereby pivots lever 162 counterclockwise (FIG. 5) to make the pencil contact the web and leave thereon a mark indicative of a defect. When solenoid 168 is deenergized, its armature returns to its normal extended position to move the pencil away from the web.

*Bump Detector Amplifier and Bump Detector Power Supply*

Each bump detector amplifier is mounted on a separate chassis with a bump detector power supply. Three skids, connected in parallel with each other, are electrically connected to one amplifier and its associated bump detector power supply. Hence, the total number of bump detector amplifiers (or bump detector power supplies) is equal to the total number of skids divided by three. If the total number of skids is not an exact multiple of three, the number of bump detector amplifiers is equal to one more than the largest whole multiple of three into which the total number of skids is divisible. Thus, for example, if the machine employs ten skids, four bump detector amplifiers and four bump detector power supplies are employed. In FIG. 2, nine skids are illustrated and, accordingly, three bump detector amplifiers and power supplies are required. For convenience of illustration, FIG. 1 shows only two bump detector amplifier-power supply units. However, it is to be understood that a third unit is also employed in practice.

Figure 13:
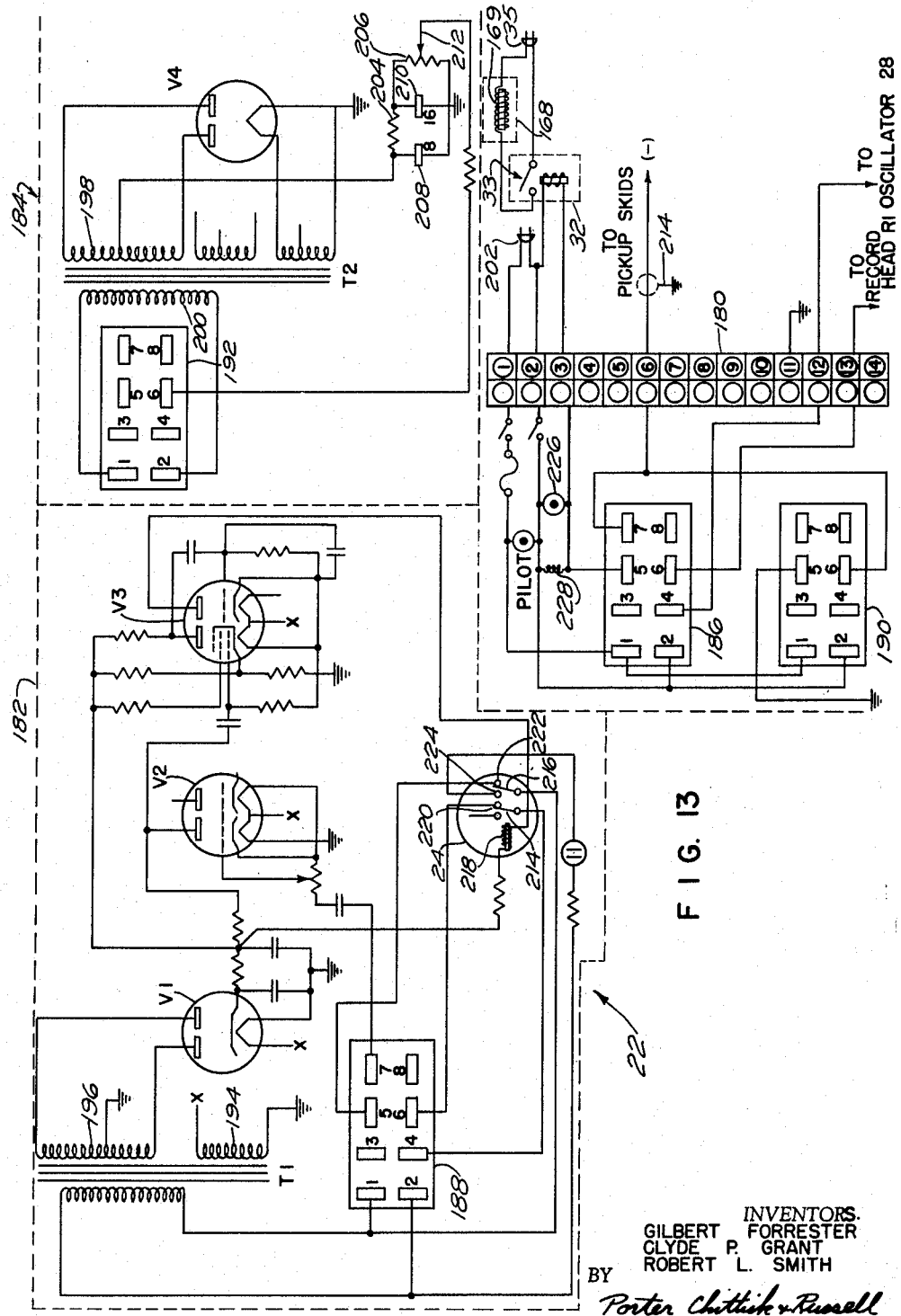
FIG. 13 is a circuit diagram of the bump detector amplifier, its output relay and the auxiliary relay for operating the bump detector web marker.

FIG. 13 is a schematic representation of the electrical system for one group of three skids. It consists of a terminal board 180, an amplifier 182, a D.C. power supply 184 for the bump detector skids, an output amplifier relay 24, an amplifier socket 186 connected to the terminal board, a mating amplifier plug 188 connected to the amplifier and output relay 24, a power socket 190 connected to the terminal board, and a mating power plug 192 connected to the D.C. power supply 184. Specific values of resistors and capacitors are omitted for the sake of clarity and also because they may be varied according to the type of tubes which are used.

The amplifier comprises three dual tubes V1, V2, and V3; but only one-half of tube V2 is employed. Tube V1 functions as a full-wave rectifier to supply D.C. voltages to the active half of tube V2 and both halves of tube V3. The heaters for the tubes are energized from the secondary 194 of transformer T1. Both plates of double diode V1 are fed from the other secondary 196 of the same transformer.

The bump detector power supply comprises a dual diode V4 functioning as a full-wave rectifier. The two plates of the dual diode are connected to the opposite ends of the secondary 198 of a transformer T2. The primary 200 of transformer T2 is connected by way of power plug 192, power socket 190, and terminal board 180 to a line plug 202 which is plugged into a conventional wall outlet leading to a 110 A.C. source. The center point of secondary 198 of transformer T1 is connected to ground through a pair of resistors 204 and 206. A pair of capacitors 208 and 210 are connected in parallel with resistances 204 and 206 to eliminate ripple in the D.C. voltage output of the power supply. Resistor 206 is a load resistor and forms part of a potentiometer whose slider 212 may be adjusted to modify the amplitude of the voltage applied to the skids. The D.C. voltage output picked up by slider 212 is negative with respect to ground and is applied to three skids by way of terminals No. 6 of power plug 192, power socket 190, and terminal board 180. It is to be noted that the leads to the skids are shielded as indicated schematically at 214.

The amplifier output relay 24 comprises two pivotal contact arms 214 and 216 controlled by a solenoid 218. The fixed terminal of contact arm 214 is connected by way of terminals No. 4 of amplifier socket 188 and plug 186 and terminal No. 12 of the terminal board 180 to oscillator 28 represented schematically in FIG. 1. The fixed terminal of contact arm 216 is connected by way of terminals No. 1 of the amplifier plug, amplifier socket, and terminal board to one side of line plug 202. Of the two switching contacts associated with contact arm 214, only one contact 220 is electrically connected to other circuit elements. Switch contact 220 is connected by way of terminals No. 6 of the amplifier plug and socket and terminal No. 13 of the terminal board to record head R1. Contact arm 216 makes and breaks connections with two contact terminals 222 and 224. Contact terminal 222 is connected by way of amplifier plug and socket terminals No. 5 and the coil of auxiliary relay 32 to the second side of line plug 202. The normally open contact switch 33 of relay 32 is connected in series with the coil 169, marker solenoid 168, and a line plug 35. Contact terminal 224 is connected to the second side of line plug 202 by way of terminals No. 2 of the amplifier plug and socket and the terminal board. The solenoid 218 of amplifier relay 24 is connected in the plate circuit of the right-hand half of tube V3.

In normal operation of the machine with the sensing skids riding on the paper monitoring for surface "bumps," tubes V1, V2, V3, and V4 are all conducting and the coil of relay 24 is energized and the contact arms 214 and 216 are in the position opposite to that shown in FIG. 13. When a bump passes under one of the skids 20, the skid is deflected upward away from the paper web. The leakage current running from the skid through the paper to the grounded roll 8 is decreased, causing the skid voltage to rise. Since the D.C. supply voltage is negative, the voltage rise is a negative pulse on the amplifier input (the control grid of the operative half of tube V2). This causes an amplified positive pulse at the plate of tube V2 and also at the control grid of the first half of tube V3. As the control grid of the first half of tube V3 swings more positive, the associated plate swings more negative. This negative pulse appears on the control grid of the right-hand half of tube V3. The right-hand half of tube V3 is operated in such a manner that the negative pulse applied to its control grid biases it beyond cut-off and the stage ceases to conduct. The plate current of the right-hand half of tube V3 falls off and the amplifier relay 24 is de-energized, whereupon contact arms 214 and 216 are caused to make contact with contact terminals 220 and 222 respectively, as shown in FIG. 13. After the pulse has passed, equilibrium is restored and the circuits resume normal operation.

The amplifier relay, when de-energized, switches the oscillator signal output to the record head R1 of the memory drum. It also energizes the auxiliary relay 32 to close its switch 33, thereby to energize the coil 169 of marker solenoid 168. Other auxiliary apparatus may also be controlled by the amplifier relay. The auxiliary apparatus may take the form of a defect light 226 or a solenoid-actuated counter having its solenoid coil 228 connected as shown in FIG. 13. The defect light will blink and the counter operate each time a bump defect is detected.

With an electrical system of the type illustrated in FIG. 13, the bump detector system can be set to detect abrupt caliper changes of the order of .0002 inch in a web moving at the rate of 300–700 feet per minute. In practice, however, it is usually set to pass caliper changes of the order of .001 inch or less.

*Void Detector Mechanism and Marker Device*

Figure 3:
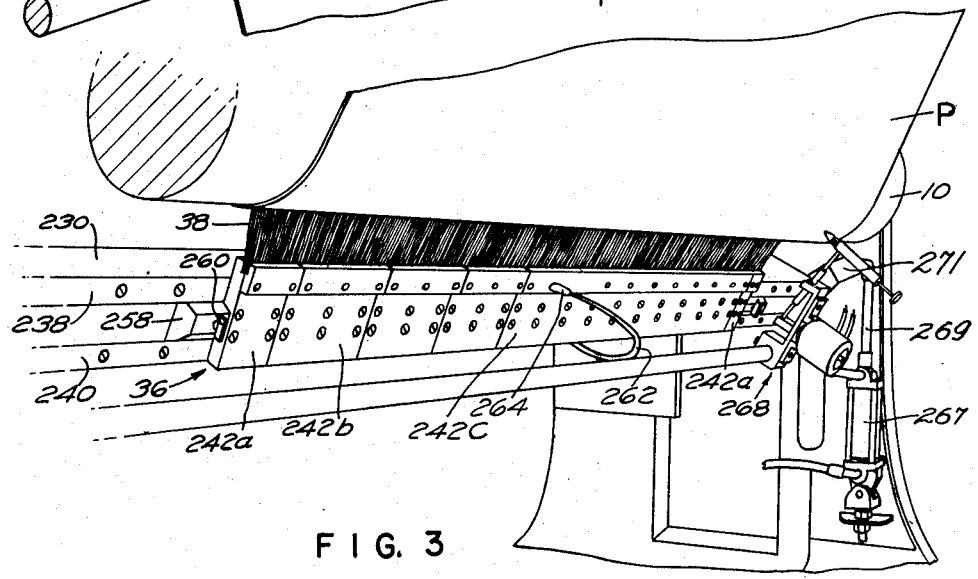
FIG. 3 is a view similar to FIG. 2 but illustrating the void detector mechanism.
Figure 4:
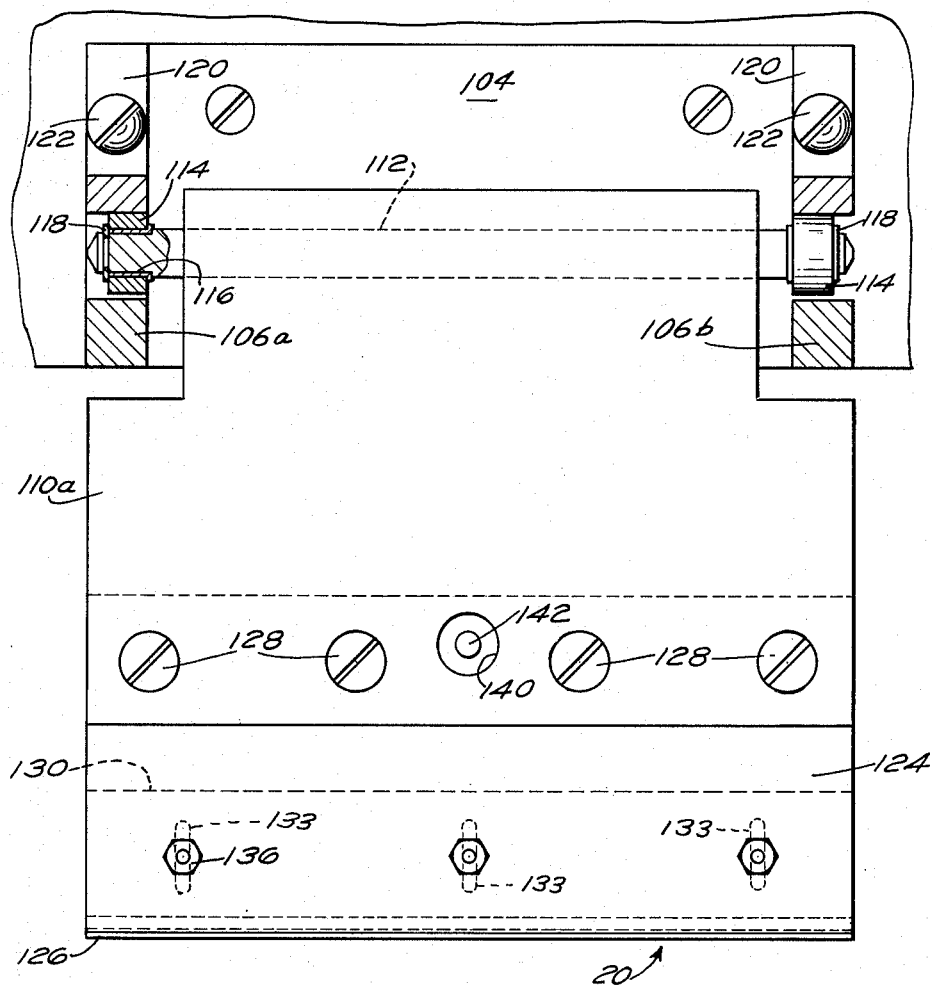
FIG. 4 is an enlarged front view of one of the skids of the bump detector mechanism.
Figure 5:
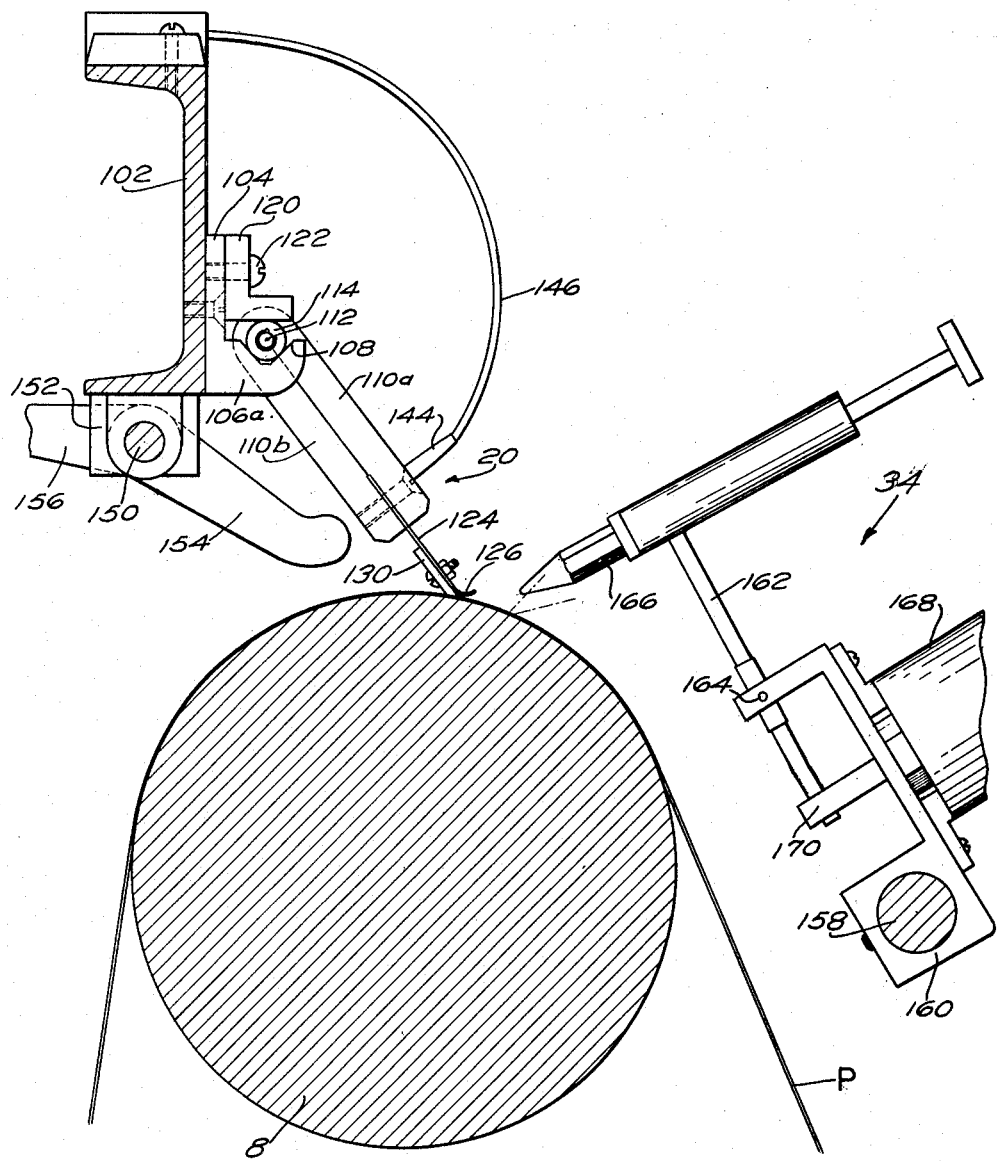
FIG. 5 is a vertical cross-section through the bump detector section of the machine.

The void detector mechanism 36 is illustrated schematically in FIG. 1 and in detail in FIGS. 3, 9, 10, 11, and 12. It includes an elongated angle iron 230 having a collar 232 welded thereto at each end. Extending through and frictionally locked to collars 232 is a supporting cylindrical shaft 234. Shaft 234 is rotatably secured to the side frames of the machine by suitable means (not shown) which permit it and angle iron 230 to be rotated to a desired position. Attached to one face 236 of the angle iron are two parallel spaced metal gibs 238 and 240 which form a mortise to support a plurality of brush units 242. Each brush unit 242 comprises a metal tenon member 244 adapted to fit in the mortise formed by gibs 238 and 240, a plastic, non-conducting plate 246 secured to the tenon 244 by screws 248, and a metal clamping plate 250 which cooperates with the upper end of plastic plate 246 to from a groove 252 in which copper bristles 38 are secured. Preferably, the inner ends of bristles 38 are tightly seated in a U-shaped copper channel 254 which is locked in grooves 252. Clamping plate 250 is secured to plastic plate 246 by means of screws 256. The brush units may be made up in different widths as shown in FIG. 3 where six units of three different sizes—242a, 242b, and 242c—are illustrated. Making the brush assembly out of several units has the advantage of making its total length adjustable to accommodate paper webs of different widths. In all cases, the length of the brush assembly is less than the overall width of the web being processed so that the bristles 38 will not engage grounded roll 10 except through a void in the web. The several brush units are held together in contacting relation by end stop members 258 which are simply tenons provided with a wingbolt 260. Wingbolts 260 bear against the face 236 of angle iron 230 to place the stop members in tight engagement with gibs 238 and 240. When the brush units are touching each other, they form a single sensing element by virtue of the physical engagement of bristles 38 with each other and also with the U-shaped channel members 254 which also engage each other. Consequently, only one unit must be directly connected to a power supply in order for a potential to be applied to all of the bristles. Connection to the power supply section of amplifier-power supply system 40 (FIG. 1) is made by a cable 262 having a jack 264 which is removably attached to a mating plug element 266 which is secured to brush unit 242C in electrical connecting relation with the copper channel member 254 forming part of that unit.

Shaft 234 is rotated to and held in a selected position by means of a pneumatic piston type actuator 267 attached to one of the side frames of the machine. As shown in FIGS. 3 and 11, the operating rod 269 of the actuator is pivotally secured to a lever 271 which is secured to shaft 234. Suitable valve mechanism (not shown) controls the air pressure applied to the actuator and determine whether the piston or actuating rod 269 is to be extended or retracted or held in a selected position. Whenever a new web of paper is to be placed in the machine, actuator 267 is operated to move bristles 38 away from roll 10.

In practice, the angle iron 230 is adjusted by actuator 267 so that bristles 38 are inclined in a forward direction and engage the web as it passes under roll 10 along a line located rearwardly of the axis of rotation of the roll. Preferably, the bristles 38 are of relatively small diameter so as to detect very small holes, but larger bristles may be used where less stringent inspection may be tolerated. The bristles scan the web continuously and, when a void appears, one of the bristles will penetrate it to produce a signal at the input terminal of the void detector amplifier.

A web marker 268 is provided to mark the web to indicate the existence and general location of a void. Web marker 268 is identical in construction to the web marker forming part of the bump detector section and is physically secured to the machine in the same manner.

It is important to note that the bristles are all in the same plane and have the same angle of attack. This assures that the bristles will be equally sensitive to voids and will wear equally.

It should be noted also that the brush assembly can be divided into discrete groups of brush units, each with its own marker and void detector amplifier and power supply. Physical division of the brush assembly into two or more groups is effected by inserting a spacer similar in construction to end stop members 258 between two brush units as, for example, between unit 242C and an adjacent unit. Of course, each group would have a brush unit provided with a plug element 266 for connection to its amplifier-power supply system.

*Void Detector Amplifier and Power Supply*

FIG. 14 illustrates the electrical system of the void detector and its associated marker device 268. This system comprises an amplifier, a D.C. supply source for both the amplifier and the void detector brush assembly, an amplifier output relay 42, an auxiliary output relay 43, an auxiliary marker relay 33, connecting circuitry including a terminal board 270, a multi-terminal socket 272, and a multi-terminal mating plug 274 for the socket.

The amplifier comprises three stages comprising triode V6 and dual tube V7. The power supply for providing D.C. plate voltages to the three amplifier stages comprises a dual diode V5 functioning as a full-wave rectifier. The input to the power-supply circuit is through transformer T3. The primary winding 276 of this transformer is coupled to terminals No. 1 and 2 of plug 274, socket 272, and terminal board 270. The coil 45 of amplifier output relay 42 is connected in the plate circuit of the right-hand section of amplifier tube V7. The amplifier output relay 42 comprises two pivotal contact arms 278 and 280. Contact arm 278 is connected at its fixed terminal to record head R2 by way of terminals No. 6 of plug 274 and socket 272. Contact arm 278 is adapted to make an electrical connection with either contact 282 or contact 284. Contact 282 is connected to the oscillator 28 by way of terminals No. 4 of the plug and socket and terminal No. 5 of the terminal board. Contact 284 is unconnected. The fixed terminal of the other contact arm 280 is connected through terminals No. 1 of plug 274, socket 272, and terminal board 270 to one side of a line plug 286 and is adapted to engage either contact 288 or contact 290. Contact 288 is connected to the second side of line plug 286 by way of terminals No. 5 of plug 274 and socket 272 and terminal No. 2 of the terminal board. Contact 290 is connected to the second side of the line plug by way of terminals No. 2 of the plug, socket, and terminal board.

The cable 262 leading to the brush units 242 of the void detector is connected to the power supply by way of terminal No. 6 of the terminal board, terminals No. 7 of socket 272 and plug 274, the coil 47 of auxiliary output relay 43, and load resistor 292. The D.C. voltage which is applied to the brushes is positive and in the illustrated embodiment is approximately 91 volts. Relay 43 comprises a movable contact arm 294 whose fixed terminal is connected to the oscillator 28 by way of terminals No. 4 of plug 274 and socket 272 and terminal No. 5 of the terminal board. Contact arm 294 is movable into contact with either contact terminal 296 or contact terminal 298. The former is unconnected; the latter is connected to record head R2 by way of terminals No. 6 of the plug and socket and terminal No. 4 of the terminal board.

The contacts of auxiliary marker relay 33, like relays 42 and 43, are shown as if the relay is in a de-energized condition. One side of the coil 35 of relay 33 is connected directly to the second side of line plug 286. The other side of the coil is connected by way of board terminal No. 3, plug and socket terminals No. 5, contact 288 and arm 280 of relay 42, and plug, socket, and board terminals No. 1 to the first side of line plug 286. The coil 35 of marker relay 33 is energized when output relay 42 is de-energized. Marker relay 33 comprises two switch sections, but only one is employed. The other switch section is provided in case other auxiliary apparatus is desired to be operated each time the marker device is actuated. The active switch section comprises a contact arm 303 which is connected to one side of a second line plug 304, and two contact terminals 306 and 308 adapted to be engaged by contact arm 302. Contact terminal 308 is unconnected. Contact terminal 306 is connected by way of the coil 269 of marker solenoid 268 (FIG. 3) to the other side of line plug 304. Coil 269 of the marker solenoid 268 is energized each time contact arm 303 engages contact terminal 306, and this occurs each time relay 33 is energized.

During normal operation (when the web is free of voids or tears), tubes V5, V6, and V7 are all conducting and relay 42 is energized (contacts are the reverse of that shown). A hole in the web passing under the brush assembly allows one or more bristles 38 of the brush to touch grounded roll 10. Current leakage from the brush to roll is greatly increased, causing the brush voltage to fall. Since the D.C. supply voltage in positive, a negative pulse appears at the amplifier input which is the control grid of tube V6. This causes an amplified positive pulse at the plate of that same tube and also at the control grid of the first half of tube V7. As this control grid swings more positive, its associated plate swings more negative and produces a negative pulse at the control grid of the right-hand half of tube V7. This third stage is operated in such a manner that the negative pulse at its control grid biases it beyond cutoff, and the stage ceases to conduct. Plate current in the third stage falls off and relay 42 is de-energized, causing its contact arms 278 and 280 to assume the position shown in FIG. 14. The normal state resumes as soon as the pulse passes.

The output relay 42, when de-energized by a pulse from the amplifier, switches the oscillator signal to the void record head R2. It also energizes marker relay 33 to actuate the void marker solenoid 268.

If the void is a long tearout, the circuitry is pulsed as described above; but the brush will remain in contact with the grounded roll 10. Leakage current in this steady state is sufficient to energize relay 43, the contacts of which switch the oscillator signal to the record head R2 when energized. This feature enables the apparatus to reject continuously all sheets to narrow from a tearout as well as those individual sheets having isolated holes.

In addition to having a marker, it is also advantageous for the machine to include a solenoid-operated counter which is actuated in synchronism with the machine. Since the bump detector system also includes a defect counter, it is possible to obtain quickly an accurate determination of the frequency of occurrence of both void and bump defects. The void defect counter is represented schematically in FIG. 14 by coil 310 which is connected between terminal 5 of socket 272 and the second side of line plug 286. The counter circuit to the other side of the line plug is completed through plug terminal No. 5, contact terminal 288, and arm 280 of relay 42, and terminals No. 1 of the plug, socket, and terminal board. A defect light 312 may be connected in the same manner as counter coil 310 to provide a visual blinking indication of the occurrence of a void defect. This is advantageous since it provides a means of checking the reject gate. If the reject gate does not operate immediately following operation of the defect light, the operator will know that something is wrong in the electrical system.

*Playback Amplifier System*

The playback system of the machine (FIG. 15) consists of playback amplifier 80 and playback output relay 82 (FIG. 1). Playback amplifier 80 comprises a plurality of preamplifier channels PC1–PC4 (each having an input terminal, PT1–PT4, for a playback head), a band pass filter F1 for passing only the 1,000 cycles component of the signals applied to the preamplifiers, an amplifier 314 for the 1,000 cycle signal component, means for actuating the output relay 82 in response to the amplified signal output of amplifier 314, and a D.C. supply 315. In the present case, only two preamplifier channels PC1 and PC2 are employed—the first for bump defect playback head P1 and the second for void defect playback head P2. The other two preamplifier channels PC3 and PC4 are available for use in the event additional defect-detecting, web-scanning devices are embodied in the machine. Thus, for example, the machine may employ a photoelectric scanner for determining whether the opacity of the web (which may be coated or uncoated) departs from a predetermined desired standard.

In the illustrated embodiment of the playback system, each preamplifier channel comprises an input transformer T4 and two stages of amplification employing transistors 316 and 318. The outputs of the several channels occur between points 320 and 322 and are applied to band pass filter F1. The 1,000 cycle output of the band pass filter is applied to amplifier at the control grid of tube V8. The amplified output of the latter is applied to the control grid of a thyratron V9 by way of an output transformer T5 and a gain control potentiometer 323.

The thyratron normally is off. When the 1,000 cycle signal is applied to the thyratron, the latter fires and actuates output relay 82.

An A.C. voltage is applied to the plate and screen grid of thyratron V9 by the secondary coil 324 of a transformer T6. The primary coil 326 of transformer T6 is connected across a 110 volt A.C. source. The D.C. power supply 315 is connected to the same line source by another transformer T7. The D.C. power supply includes a voltage regulator comprising tube V10 for stabilizing the D.C. bias voltage which is applied to the control grid of thyratron V9 by way of lead 328. From the same D.C. power supply, D.C. bias is applied to the screen grid of amplifier tube V8 by way of lead 330 and to the transistors 316 and 318 of the several preamplifier channels by way of lead 332.

In normal operation, tube V8 is conducting, tube V9 is not conducting, and the output relay 82 is de-energized with its contacts as shown in FIG. 15. When a signal is read out by playback heads P1 or P2, it is amplified through the two transistor stages of preamplifier channel PC1 or PC2 respectively, filtered by band-pass filter F1, and then amplified in the final power stage which includes tube V8. From the output transformer T5, the signal goes to the control grid of thyratron V9 through a gain control potentiometer 323. Thyratron V9 conducts when the signal voltage is applied to its control grid; and when it conducts, its plate current is sufficient to energize output relay 82. With no signal at the playback heads P1 and P2, normal operation resumes with relay 82 de-energized. When the output relay 82 is actuated, it switches a 28 volt D.C. pulse from the 28 volt D.C. source 84 to reject relay system 86.

*Reject Relay System*

Figure 16:
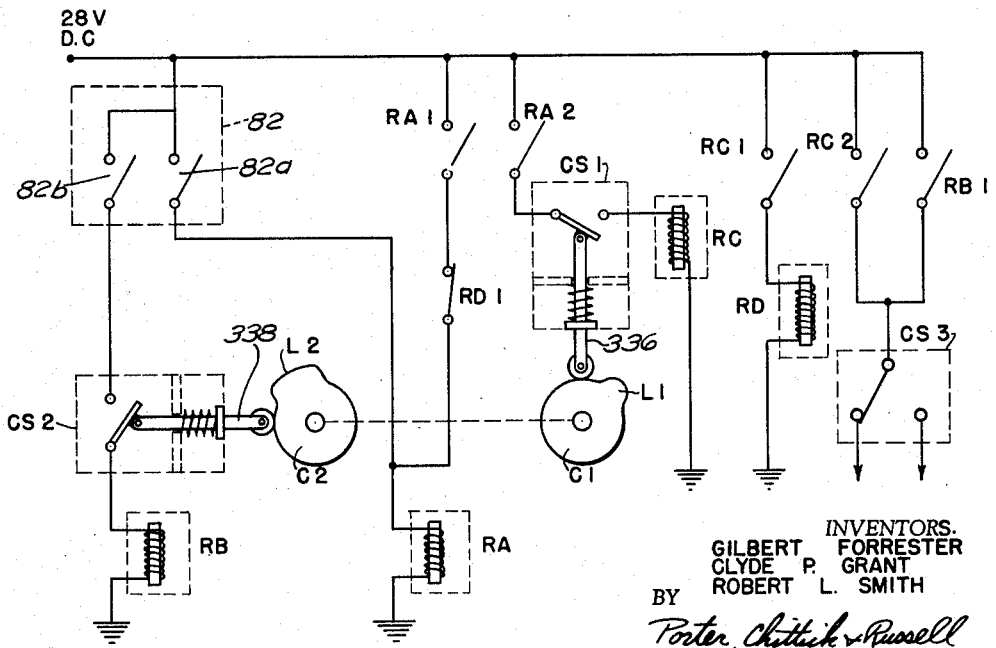
FIG. 16 is a schematic diagram of the electro-mechanical reject relay system which is coupled to the output relay of the playback system.

The reject relay system, as illustrated schematically in FIG. 16, includes output relay 82 of the playback system since operation of the reject relay system is dependent upon it. Relay 82 consists of two normally open switch sections 82a and 82b.

The reject relay system comprises four relays RA, RB, RC, and RD. Relay RA has two contact switches RA1 and RA2 which are normally open. Relay RB has one normally open contact switch RB1. Relay RC has two normally open contact switches. Relay RD has one normally closed contact switch RD1. Relays RA and RB are connected in parallel between ground and the 28 volt D.C. supply source 84 through the two normally open contact switches 82a and 82b respectively of the output relay of the playback system. Connected in series with relay RC and contact switch RA2 is a normally open switch CS1 which has a spring biased actuating arm 336 which is operated by cam C1 which is operatively coupled to the rotary knife drive 48. Each time the lobe L1 of cam C1 engages switch arm 336, switch CS1 closes.

Contact switches RA1 and RD1 are connected in series with the coil of relay RA but in parallel with contact switch 82a of playback system output relay 82. Connected in series with contact switch 82b of output relay 82 and the coil of relay RB is a normally open switch CS2 having a spring-biased arm 338 which is operated by a second cam C2 which is mounted on a common shaft with cam C1. Each time the lobe L2 of cam C2 engages switch arm 338, switch CS2 closes. It is to be noted that the lobe L2 of the second cam C2 extends through a greater arc than the lobe of cam C1. Cams C1 and C2 actuate switches CS1 and CS2 at the same instant, but cam C2 keeps switch CS2 closed for a short while after switch CS1 has reopened. Switch CS2 is closed for a period less than 3.5 percent of the time required for cam C2 to make one complete revolution. Both switches are closed by the cams immediately before the web is severed by the rotary knife 46 with switch CS1 opening the instant the web is severed and switch CS2 opening a moment later. Switch CS1 stays closed just long enough to pulse a relay, whereas switch CS2 stays closed until slightly after cutoff and overlaps the tail of a sheet being cut off and the head of the sheet immediately following.

Contact switch RC1 of relay RC is connected in series with the coil of relay RD. The second contact switch RC2 of relay RC is connected in parallel with contact switch RB1 and in series with switch CS3. The latter switch forms a part of the clutch-controlled, cam-operated sheet following electrical system illustrated in FIG. 17.

Figure 17:
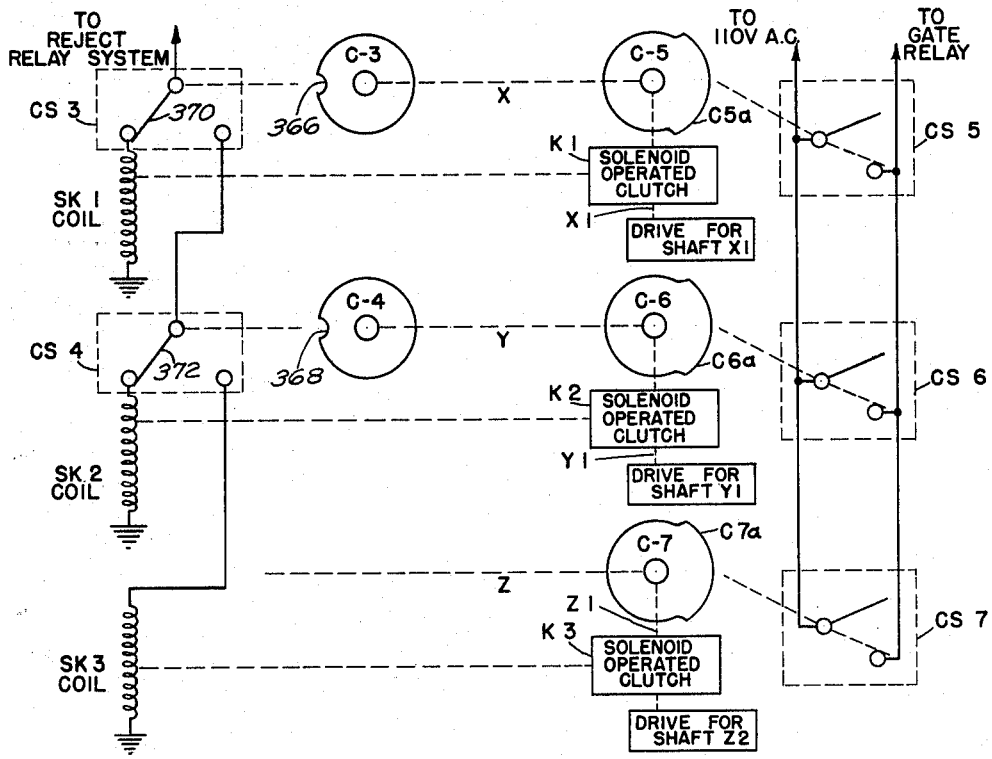
FIG. 17 is a schematic diagram of the clutch-controlled cam-operated sheet following relay system.

The function of the reject relay system is to initiate operation of the single revolution cams of the sheet following system of FIG. 17 at the proper times so as to have the reject gate 68 operate at the proper time to reject the sheet containing the defect indicated by operation of output relay 82 of the playback system.

Two modes of operation are established by the reject relay system, depending on the location of the defect in the sheet.

The most common mode of operation occurs when the playback system output relay 82 closes and switches CS1 and CS2 are open. This occurs when the defect is not located in the knife cut zone established by cam C2. Relay RA is energized, causing contact switch RA1 to close to establish a holding circuit for relay RA through the normally closed switch RD1 of relay RD. Relay RA remains energized until switch CS1 is closed by cam C1 (tail of sheet) so that if additional defects are detected subsequently in the same sheet, the additional output pulses from the playback system are shunted to ground through the coil of relay RA. Closing of switch CS1 causes relay RC to be energized, and this in turn causes contact switch RC2 to close to pass a 28 volt D.C. pulse to switch SC3 of the sheet following system. Relay RA is de-energized by relay RD which is energized by the closing of switch RC1 when relay RC is energized. When relay RD is energized, its switch RD1 opens to de-energize relay RA. Relay RC drops out upon opening of switch CS1.

The other mode of operation occurs when the playback system output relay 82 closes while switches CS1 and CS2 are closed by cams C1 and C2. The defect itself must then be located in the knife cut zone which includes a narrow band at the tail of the sheet being cut off and a narrow band at the head of the sheet following. Relay RB is energized directly and a pulse passes to switch CS3 of the sheet following system through switch RB1 to reject the sheet being cut off. Relay RB de-energizes when either switch CS2 or switch 82b reopens. Relay RA also is energized when relay 82 is actuated, and it remains in this state through the switch RD1 of relay RD even after switch CS2 opens. Relay RA remains energized until the next time switch CS1 is closed by cam C1 (tail end of sheet following), at which time relay RC is energized to close switch RC2 and pass another pulse to switch CS3 to reject the second sheet also. The circuit of relay RA is reset by relay RD which is operated to open switch RD1 when relay RC is energized.

Thus, if a defect falls in the knife cut zone, both sheets involved are rejected. This covers the possibility of a single defect being cut in two to produce two defective sheets. It also provides for rejection of both sheets when it is impossible to determine with certainty which sheet has the defect.

*Cam- and Clutch-Controlled Sheet Tracking and Gate Operating System*

This system is illustrated in FIGS. 17 and 18. It operates each time a defective sheet is cut off and functions to operate the reject gate relay 94 (FIG. 1) which in turn causes the reject gate solenoid 78 to be energized from the 220 volt source 96, thereby to operate the reject gate in time to reject the defective sheet. This system is designed to track up to three defective sheets at a time. The number of sheets which the system must be capable of tracking is the number of whole sheets of predetermined length which can be accommodated between the sheeter-cutter and the reject gate. If the tape bed is increased to accommodate a greater number of sheets—e.g., five sheets—then the sheet tracking system must be enlarged by the addition of two sheet tracking means.

In the illustrated embodiment, the cam and clutch-controlled sheet following relay system comprises three shafts X, Y and Z. The shaft X is connected by means of a spring friction clutch K1 to a drive shaft X1 which is driven by chain 350 acting through sprocket 342, chain 344, sprocket 346, shaft Y1, and sprocket 348. Chain 350 is driven at a constant ratio to the tape bed drive 56. Shafts Y and Z are coupled by identical clutches K2 and K3 to shafts Y1 and Z1. Shaft Y1 is driven by sprocket 348 and chain 350. Shaft Z1 is driven by sprocket 352, chain 344, sprocket 346, shaft Y1, sprocket 348, and chain 350. Shafts X, Y, and Z carry identical detent disks DX, DY, and DZ respectively. Shaft X normally is held against rotation by an armature flap 356 which is pivotally secured at one end to an arm 358 and which is attached also to the armature 360 of a solenoid SK1. Clutch K1 provides infinite slippage between shafts X and X1 until detent disk DX is released by upward movement of flap 356 which occurs when solenoid SK1 is energized. When the detent disk DX is released, shaft X is driven by shaft X1 and will continue to rotate until flap 356 again engages the shoulder DX1 on detent disk DX. Identical solenoids SK2 and SK3 and flaps 362 and 364 control operation of shafts Y and Z respectively in the same manner. Since solenoids SK1, SK2, and SK3 are energized by pulses, they operate just long enough to release detent disks DX, DY, and DZ. Thus in effect, shafts X, Y, and Z are operated by single revolution clutches.

Two cams C3 and C5 are mounted on shaft X. Cam C4, identical to cam C3, is mounted on shaft Y. Cams C6 and C7, identical to cam C5, are mounted on shafts Y and Z respectively. Cams C3 and C4 have notches 366 and 368 respectively in their edge surfaces and function to operate switches CS3 and CS4 respectively. These switches are double throw switches having spring-biased actuating arms 370 and 372 having rollers 374 and 376 which ride on cams C3 and C4 respectively. When the rollers are in notches 366 and 368, switch CS3 is connected in series with the coil of solenoid SK1, and switch CS4 is connected in series with the coil of solenoid SK2; and when the rollers are out of the notches 366 and 368, switch CS3 is connected in series with the coil of solenoid SK2, and switch CS4 is connected in series with the coil of solenoid SK3. The rollers are in notches 366 and 368 when shafts X and Y are at rest and ride out of the notches immediately after these shafts begin to rotate.

These additional cams C5, C6, and C7 are mounted on shafts X, Y, and Z respectively. Associated with cams C5, C6, and C7 are three normally open switches CS5, CS6, and CS7 respectively. These switches have spring-biased operating arms 380, 382, and 384 provided with rollers 386, 388, and 390 respectively which ride on the edges of cams C5, C6, and C7 respectively. The terminals of each of the switches CS5, CS6, and CS7 are connected in series with the 110 volt source 92 and gate relay 94. The raised portions C5a, C6a, and C7a of the cams act on the switch arms to close the switches. Cams C5, C6, and C7 are so constructed that the effective length of the raised portions of each cam, based on the angular speed of rotation of the cams, is equal to and represents a time period slightly longer than the time required for a sheet of predetermined length to pass fully through the reject gate. The extra time is to allow for opening the gate; and since this is accomplished quite rapidly, the extra time is quite small.

Operation of the sheet tracking system will now be described. When a pulse from the reject relay is applied to the sheet tracking or following system by way of relay switches RB1 or RC2, it normally energizes the coil of solenoid SK1, releasing shaft X which starts to turn immediately. As soon as shaft X starts to turn, cam C3 operates switch CS3 so that the next pulse can be received by the coil of solenoid SK2. At a predetermined point in the cycle of rotation of shaft X, cam C5 closes switch CS5, causing the gate relay 94 to be energized. Operation of the gate relay closes the circuit between reject gate solenoid 78 and the 220 volt source 96, causing the solenoid to operate the reject gate 68. The lobe or raised portion C5a of cam C5 is designed so that switch CS5 is actuated just as the head of the defective sheet approaches reject gate 68 and released just after the tail of that sheet has passed the gate. One revolution of cam C5 corresponds to the distance from the bed knife to the gate. Cam C5 is always started at the time of the cut; and since sheet position at the start and the distance from the tail of the sheet to the gate are constant, it is necessary only to adjust the length of the lobe of cam C5 to account for the time required for the head of the defective sheet to reach the gate. If cams with lobes of adjustable length are used in place of cams C5, C6, and C7, the adjustment may be calibrated in terms of sheet length. Since the cam drive is geared to the tape bed drive as indicated schematically in FIG. 1, no adjustment for machine speed is necessary and the system will operate at all speeds of the machine. The cams C6 and C7 are provided since more than one defective sheet may be on the tape bed at any one time, and a cam can follow only one sheet at a time. If a second pulse is produced by the reject relay assembly while shaft X is rotating, it will energize the coil of solenoid SK2, releasing shaft Y. Cam C6 then behaves as cam C5 before it, causing switch CS6 to energize the gate relay 94 to operate and hold open the reject gate to pass the defective sheet represented by the second pulse. In addition, as soon as shaft Y starts to rotate, its cam C4 actuates switch CS4 so that if a third pulse is produced while shafts X and Y are still in operation, it will energize solenoid SK3 to free shaft Z. Rotation of shaft Z causes cam C7 to operate switch CS7 at the proper time to actuate the gate relay, which in turn will operate gate solenoid 78 to pass the third defective sheet. Shaft X will have returned to its home position by the time switch CS7 is operated; and, since cam C3 connects switch CS3 to solenoid SK1 when shaft X is in the home position, the next pulse from the reject relay system will again energize solenoid SK1.

The present invention is applicable regardless of the width, weight, or type of paper web being processed. It provides a system that is fully automatic and capable of functioning at both high and low web speeds. It is adaptable to machines of different lengths as well as machines employing a reciprocating, instead of a rotating, sheeter-cutter. In addition to the bump and void detector, other inspecting devices may be used. It discriminates between abrupt and gradual changes in caliper and between caliper changes and voids or conductive particles. By providing a different web marker for each bump detector amplifier, it is possible to indicate where a defect is located with respect to the side edges of the web. Similarly, if the void detector is subdivided into a plurality of electrically independent brush units and a separate marker is provided for each brush unit, it is possible to indicate the approximate location of a void or conductive particle with respect to the side edges of the web.

The bump detector skids are removable for repairs or for varying the overall length of the assembly. Similarly individual skids may be deactivated without difficulty by simply disconnecting the appropriate jacks 144 from their associated plugs 142. The brush assembly is readily deactivated in the same manner. The construction of the brush assembly permits the brush units to be shifted laterally or divided into separate groups. Moreover the brush units are readily replaceable and are inexpensive to construct. The bristles may be made of copper, bronze or brass or any other resilient conductive material.

Obviously, many modifications and variations of the present invention are possible in the light of the above teachings. Therefore, it is to be understood that the invention is not limited in its application to the details of construction and arrangement of parts specifically described or illustrated, and that within the scope of the appended claims, it may be practised otherwise than as specifically described or illustrated.

We claim:

1. Apparatus for detecting changes in caliper in a paper web independently of voids in said web comprising means for transporting a paper web along a predetermined path, said web transporting means including an electrically grounded rotating roll engaged by one side of said web, a plurality of pivotally mounted skids each having an electrode and a shoe formed of insulating material in sliding engagement with the other side of said web, said shoe adjusted to maintain a predetermined spacing between said electrode and said web, means connecting said skids to a source of electrical potential, means for detecting a change in electric current leakage between said skids and said roll resulting from deflection of said skids by a change in caliper of said web, and means for producing an output signal indicative of a change in web caliper each time said electric current exhibits a change of predetermined magnitude.

2. Mechanism for detecting abrupt changes in caliper of a web comprising means for transporting a web, said web transporting means including an electrically grounded roll engaged by one side of said web, a stationary bar located above said roll in parallel relation thereto, a plurality of pairs of horizontally spaced brackets secured to said bar, a like plurality of skids, means pivotally securing said skids to said pairs of brackets, said skids each comprising a metallic plate and an insulating shoe attached to said plate, said shoes extending transversely of and engaging the opposite side of said web with an air gap between said web and plates, said skids being movable in response to changes in caliper of said web, a source of electrical potential, means connecting each of said plates to said source of electrical potential, means for detecting a change in capacitive current between each skid and said roll resulting from deflection of said each skid by an abrupt change in caliper of said web, and means for producing an output signal indicative of an abrupt change in web caliper each time said change in current is of predetermined magnitude.

3. Mechanism as defined by claim 2 further including a shaft, means rotatably supporting said shaft in parallel spaced relation with the pivotal axis of said skids, a like plurality of arms attached to said shaft in line with said skids, and means for rotating said shaft in a direction to cause said arms to engage, elevate and hold said skids out of contact with said web.

4. Apparatus for detecting changes in the characteristics of a paper web independently of voids in said web comprising means for transporting a paper web along a predetermined path over an electrically grounded rotating roll, a plurality of pivotally mounted skids each having an electrode and a shoe formed of insulating material in sliding engagement with the surface of said web, said electrode on said skid being at all times isolated from electrical ground means for applying an electric potential between said skid and said roll, means for detecting a change in electrical current leakage between said skids and said roll, and means for producing an output signal for changes in said leakage current of predetermined magnitude.

5. Bump detector mechanism for a running web comprising a conductive roll over which said web passes, a plurality of skids pivotally supported in edge adjacency across the width of said web, means for making electric connection to different sets for said skids, means urging said skids against said web on said roll, means for electrically energizing said skids to maintain a potential difference between said skids and said roll, and impulse circuit means capactively coupled to at least one set of said skids and said roll to sense rapid variations in said potential difference thereby responding to abrupt deflection of a skid in said set and not responding to gradual changes in the thickness of said web.

6. Apparatus according to claim 5 in which said skids comprise a conductive plate and a dielectric shoe carried by said plate, said shoe bearing against the web running over said roll and maintaining said plate spaced from the surface of said web.

7. In a detector assembly having a support electrode on which a running web is supported and a skid which bears against the surface of said web on said electrode for sensing characteristics of said running web, the combination comprising a conductive plate, means for supporting said plate on said skid for movement toward and away from the surface of said web, means for urging said skid toward the surface of said web, a dielectric shoe mounted on said skid to bear against the surface of said web and maintain said plate spaced from said surface, and circuit means including a source of potential coupled to said plate and said electrode.

References Cited in the file of this patent
UNITED STATES PATENTS

| | | |
|---|---|---|
| 1,087,831 | Ketchum | Feb. 17, 1914 |
| 1,277,039 | Braitmayer | Aug. 27, 1918 |
| 1,555,249 | Pickard | Sept. 2, 1925 |
| 1,878,109 | Clark | Sept. 20, 1932 |
| 2,093,198 | Kleinmann | Sept. 14, 1937 |
| 2,221,516 | Hathaway | Nov. 12, 1940 |
| 2,229,638 | Chamberlin et al. | Jan. 28, 1941 |
| 2,254,197 | Andre | Sept. 2, 1941 |
| 2,563,213 | Coleman | Aug. 7, 1951 |
| 2,576,043 | Rendel | Nov. 20, 1951 |
| 2,617,528 | Moore | Nov. 11, 1952 |
| 2,741,732 | Cunningham | Apr. 10, 1956 |
| 2,806,373 | Bendsten | Sept. 17, 1957 |
| 2,826,911 | Hartford et al. | Mar. 18, 1958 |
| 2,834,206 | Mindheim et al. | May 13, 1958 |
| 2,844,250 | Bayha | July 22, 1958 |
| 2,942,248 | Higgins | June 21, 1960 |
| 2,950,640 | Camp | Aug. 30, 1960 |
| 2,978,636 | Fountain | Apr. 4, 1961 |
| 2,978,941 | Geiszler et al. | Apr. 11, 1961 |